United States Patent Office 3,236,863
Patented Feb. 22, 1966

3,236,863
ORGANOPHOSPHORUS COMPOUNDS AND RESINS EMPLOYING SAME
Percy L. Smith, Dunbar, and Charles W. McGary, Jr., South Charleston, W. Va., assignors to Union Carbide Corporation, a corporation of New York
No Drawing. Filed Jan. 11, 1962, Ser. No. 165,671
16 Claims. (Cl. 260—346.8)

This invention relates to novel phosphorus-containing dicarboxylic acids and anhydrides and to methods for producing same. More particularly, this invention is concerned with phosphorus-containing dicarboxylic acids and anhydrides which are eminently suited as reactants or hardeners for resin-forming organic vic-epoxides for providing flame-proof characteristics to resins formed therefrom. The invention also relates to curable compositions containing the novel compositions of this invention and a resin-forming organic vic-epoxide and to resins therefrom.

The compositions of this invention are phosphinyl-substituted organic dicarboxylic acids and anhydrides and include dialkoxyphosphinyl-substituted, dicycloalkoxyphosphinyl-substituted, diaryloxyphosphinyl-substituted, di(haloalkoxy)phosphinyl - substituted, di(haloaryloxy) phosphinyl-substituted, and di(halocycloalkoxy)phosphinyl-substituted succinic acids and anhydrides. These compositions are represented by acids of the following formula and the corresponding anhydrides thereof:

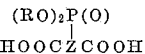

wherein Z is a trivalent organic group including trivalent saturated aliphatic hydrocarbon groups, aryl-substituted and/or halogen-substituted derivatives thereof and contains from 2 to 16 carbon atoms, and R is a monovalent hydrocarbon radical including alkyl groups such as methyl, ethyl, propyl, butyl, heptadecyl and the like, cycloalkyl groups such as cyclopentyl, cyclohexyl and the like, aryl groups such as phenyl, tolyl, naphthyl and the like, or a halogenated monovalent hydrocarbon radical such as halogenated aryl groups, for example, bromophenyl, chlorophenyl, chlorotolyl and the like; halogenated alkyl groups, for example, chloromethyl, chloroethyl, bromopropyl and the like; and halogenated cycloalkyl groups, for example, chlorocyclopentyl, bromocyclohexyl and the like. It is preferred that the monovalent hydrocarbon radicals that R represents contain up to 18 carbon atoms, since no commensurate advantages are gained by employing monovalent hydrocarbon radicals containing a greater number of carbon atoms.

Typical novel compositions of this invention include diethoxyphosphinylsuccinic acid and anhydride, di(2-chloroethoxy)phosphinylsuccinic acid and anhydride, diphenoxyphosphinyl-succinic acid and anhydride, di(heptadecoxy)phosphinylsuccinic acid and anhydride, dimethoxyphosphinylsuccinic acid and anhydride, di(3-bromopropoxy)phosphinylsuccinic acid and anhydride, dicyclohexoxyphosphinylsuccinic acid and anhydride, ditolyloxyphosphinylsuccinic acid and anhydride, di(chlorophenoxy)phosphinylsuccinic acid and anhydride, di(bromocyclohexoxy)phosphinylsuccinic acid and anhydride, dibutoxyphosphinylmethylsuccinic acid and anhydride, di(chloromethoxy)phosphinyl(methyl)succinic acid and anhydride, di(chlorotolyloxy)phosphinylisopropylsuccinic acid and anhydride, 2-[di(chlorocyclopentoxy)phosphinyl]ethylsuccinic acid and anhydride, 3-(dinaphthyloxyphosphinyl)propylsuccinic acid and anhydride, dimethoxyphosphinyl(chloroethyl)succinic acid and anhydride, di(chloroethoxy)phosphinyl(dimethyl)succinic acid and anhydride, dipropoxyphosphinyl(chloro)succinic acid and anyhdride, dicyclopentoxyphosphinyl(phenyl)succinic acid and anhydride, diethoxyphosphinyldodecylsuccinic acid and anhydride and the like.

In accordance with this invention, the novel compositions are prepared by heating a mixture of an ethylenically unsaturated dicarboxylic anhydride and an organic phosphonate in the presence of a free radical addition catalyst, and maintaining the mixture at a temperature sufficiently elevated to cause the phosphorus bonded hydrogen and the phosphorus atom of the organic phosphonate to respectively add to the double bonded carbon atoms of the ethylenic unsaturation of said dicarboxylic anhydride. The phosphinyl-substituted saturated aliphatic hydrocarbon dicarboxylic anhydride thus produced is recovered from the reaction mass by known procedures, e.g., fractional distillation, falling-film stripping, and the like. The corresponding acid is obtained by the reaction of said anhydride with water in the usual manner of converting anhydrides to corresponding acids.

Mole ratios of the organic phosphonate compound and ethylenically unsaturated dicarboxylic acid employed as starting materials in the process of this invention, are not critical. Stoichiometric amounts are preferred for efficient reaction and ease of product recovery. For example, one mole of the organic phosphonate compound is preferred for each mole of ethylenic unsaturation to be reacted in the ethylenically unsaturated dicarboxylic acid. Other than stoichiometric amounts of the organic phosphonate and of the ethylenically unsaturated dicarboxylic acid can also be used, but no commensurate advantage is obtained thereby.

The free radical addition catalysts which are employed in the process of this invention include organic peroxides and azo compounds. Specific examples of organic peroxide catalysts operative herein include methylethyl ketone peroxide, ditertiary butyl peroxide, dibenzoyl peroxide, diacetyl peroxide, dicumyl peroxide, tertiary butyl peracetate, tertiary butyl perbenzoate and the like. Specific examples of azo compounds operative herein include α,α'-azo diisobutyronitrile and 2,2'-dicyanoazobenzene. Without wishing to be bound by any one particular theory, it is believed that the reaction proceeds by a free radical mechanism, as the catalysts employed are known catalysts for reactions involving unsaturated organic compounds which proceed by a free radical mechanism. Thus, the catalysts useful in the process of this invention can be termed free radical addition catalysts. The concentration of catalyst is not critical and may vary from 0.01 to 10 percent by weight of the reactants, i.e., the ethylenically unsaturated dicarboxylic acid and organic phosphonate.

The temperatures at which the process of this invention is carried out are not narrowly critical and can vary from 25° C., and lower, to 250° C. depending upon the rate of decomposition of the particular free radical addition catalyst used. The temperature must be sufficiently elevated to form free radicals from the catalyst and should be chosen so that the free radical formation does not take place with explosive violence. With the more active free radical addition catalysts such as, for example, dibenzoyl peroxide, tertiary butyl perbenzoate and the like, temperatures of from 50° C. to 100° C. are preferred. Whereas when a less active free radical addition catalyst is used, for example ditertiary butyl peroxide, temperatures of from 100° C. to 180° C. can be used. However, with the latter catalysts a temperature range of from 120° C. to 160° C. is preferred.

The pressure at which the process of this invention is carried out is not critical. Pressures above or below atmospheric can be used if desired; however, it is preferred that the process be carried out at an atmospheric pressure. When one or more of the reactants is too volatile for practical reaction at atmospheric pressure, the reaction may conveniently be run in a pressure vessel.

A solvent is not necessary in the process of this invention, although a solvent may be employed if desired. The solvent employed should be selected so that it is non-reactive toward the reactants and catalysts. Solvents such as benzene, toluene and the like are useful.

The organic phosphonates employed as starting materials include diethyl phosphonate, di(2-chloroethyl) phosphonate, dimethyl phosphonate, dipropyl phosphonate, dibutyl phosphonate, di(heptadecyl) phosphonate, dicyclopentyl phosphonate, dicyclohexyl phosphonate, diphenyl phosphonate, ditolyl phosphonate, dinaphthyl phosphonate, di(bromophenyl) phosphonate, di(chlorophenyl) phosphonate, di(chlorotolyl) phosphonate, di(chloromethyl) phosphonate, di(bromopropyl) phosphonate, di(chlorocyclopentyl) phosphonate, di(bromocyclohexyl) phosphonate, and the like. The use of "(O)" in the formulas herein designates oxygen which is bonded to only phosphorus, e.g., P=O, and no differentiation is being made herein between →O (or semipolar linkage) and =O (or double-bond linkage). In many instances, the phosphonates exist in the tautomeric form as the diesters of phosphorous acid, e.g., $(RO)_2POH$ where R has the above-defined meaning. In these instances such diesters are equivalent to the phosphonates and are used in place of said phosphonates in the process of this invention. Such diesters of phosphorous acid are, for example, dimethyl hydrogen phosphite $[(CH_3O)_2POH]$, diphenyl hydrogen phosphite $[(C_6H_5O)_2POH]$, di-2-ethylhexyl hydrogen phosphite $[C_8H_{17}O)_2POH]$, and the like. The nomenclature employed herein to designate phosphorus compounds is in accordance with the rules for naming compounds containing one phosphorus atom as approved by the general nomenclature committee of the Organic Division of the American Chemical Society and as published in Chemical and Engineering News, Volume 30, Number 43, pages 4515 through 4522 (October 27, 1952).

Ethylenically unsaturated dicarboxylic anhydrides employed in the production of the compositions of this invention include maleic anhydride, alkyl-substituted maleic anhydrides, aryl-substituted maleic anhydrides, dialkyl-substituted maleic anhydrides, halogen-substituted maleic anhydrides, alkenyl-substituted succinic anhydrides, alkylidene-substituted succinic anhydrides, haloalkyl-substituted maleic anhydrides, and the like, wherein each of the specified organic substituents contains up to 14 carbon atoms. Specific examples of such reactants are maleic anhydride, methylmaleic anhydride, methylenesuccinic anhydride, isopropylidenesuccinic anhydride, ethylidenesuccinic anhydride, ethylbutenylsuccinic anhydride, allylsuccinic anhydride, phenylmaleic anhydride, chloromaleic anhydride, bromomaleic anhydride, dimethylmaleic anhydride, chloromethylmaleic anhydride, 2-dodecenylsuccinic anhydride, dodecylmaleic anhydride, and the like.

The acids corresponding to the above-mentioned anhydrides can also be employed as reactants.

The novel compositions of this invention are particularly suited for use as hardeners for or reactants with resin-forming organic vic-epoxides to harden same and at the same time provide flame-resistant resins. They are also eminently suited for use with polyhydric alcohols, e.g., ethylene glycol, other dicarboxylic acids or anhydrides, e.g., maleic acid, and/or ethylenically unsaturated monomers, e.g., styrene, in the manufacture of polyester or alkyd resins having flame-resistant properties. The novel compositions of this invention are particularly suited for these uses in that they are characteristically in the form of mobile liquids at room temperatures, e.g., about 25° C., and lower, and they are characteristically more reactive than the corresponding anhydride or acid having no phosphinyl substitution. It has also been surprisingly discovered that the phosphinyl substituents of the novel compositions are unusually stable towards hydrolysis. The novel compositions can be employed, in purified form or as crude residue products without purification, as hardeners or reactants in making epoxide or alkyd resins.

Typical resin-forming organic vic-epoxides are those organic compounds containing at least two vic-epoxy groups. Illustrative of such epoxides are the polyglycidyl polyethers of polyhydric phenols, e.g., the well-known reaction products of halohydrins or epihalohydrins including 3-chloro-1,2-propanediol and epichlorhydrin with polyhydric phenols including resorcinol, catechol, 4,4'-dihydroxydiphenyldimethylmethane, and the like. In addition, the epoxides obtained by the epoxidation of ethylenically unsaturated organic compounds (preferably having two or more ethylenically unsaturated groups) with an epoxidizing agent, namely a peracid such as peracetic acid, perpropionic acid, perbenzoic acid, and the like, in the well-known manner. Such epoxides include dicyclopentadiene dioxide, vinylcyclohexene dioxide, divinylbenzene dioxide, 3,4-epoxy-6-methylcyclohexylmethyl 3,4-epoxy-6-methylcyclohexanecarboxylate, bis(3,4-epoxycyclohexylmethyl) hydrocarbon dicarboxylates, bis(2,3-epoxycyclopentyl) ether, epoxidized soya bean oil, butadiene dioxide, and the like.

The novel compositions of this invention can be mixed with organic vic-epoxides as set forth above to produce curable compositions which are useful for a variety of purposes, such as coating, molding, casting, bonding, laminating, potting, and the like. Such curable compositions polymerize at temperature ranging from 25° C. to 250° C. to provide resins having a wide range of properties and which are characteristically flame-resistant. Acidic or basic catalysts can be included in the curable compositions to reduce the curing temperature if desired and/or to shorten the curing time. Such acidic and basic catalysts include the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulofnic acid, lower alkyl substituted-benzenesulfonic acid, and the like; the alkali metal hydroxides, e.g., sodium hydroxide, potassium hydroxide, and the like; the amines and other basic, nitrogen-containing, organic compounds, e.g., alpha-methylbenzyldimethylamine, dimethylethylamine, triethylamine, tripropylamine, trimethylammonium hydroxide, and the like. When the catalyst and the curable composition are immiscible, the catalyst can be added as a solution in an inert normally-liquid organic medium. In general, catalyst concentrations from about 0.005 to about 15 weight percent, preferably about 0.01 to about 5 weight percent based on the weight of the organic vic-epoxide, are advantageous.

In addition, active organic hardeners can be incorporated into the curable compositions if desired. Such other active organic hardeners include the polycarboxylic acids or anhydrides, polycarboxy polyesters, polyhydroxy polyesters, polyhydric phenols, polyhydric alcohols, polyfunctional amines, polythiols, polyisocyanates, polyisothiocyanates, polyacyl halides, and the like. Representative of such other organic hardeners are oxalic acid, succinic acid, glutaric acid, adipic acid, suberic acid, alkylsuccinic acids, alkenylsuccinic acids, maleic acid, itaconic acid, allylmalonic acid, 3-hexynedioic acid, 1,2-cyclohexanedicarboxylic acid, phthalic acid, terephthalic acid, phthalic anhydride, tetrahydrophathalic anyhydride, maleic anhydride, glutaric anhydride, succinic anhydride, nonenylsuccinic anhydride, 1,8-naphathalic anhydride, lower alkyl substituted-bicyclo[2.2.1]hept-5-ene-2,3-dicarboxylic anhydride, methylbicyclo[2.2.1]hept-2-ene-2,3-dicarboxylic anhydride, ethylene glycol, the polypropylene glycols, 1,1,1-trimethylolpropane, the polyvinyl alcohols, the cyclopentanediols, the cyclohexanediols, resorcinol, catechol, bis(4-hydroxyphenyl)-2,2-propane, 1,8-naphthalenediol, polycarboxy polyesters prepared by known condensation precedures, employing mole ratios favoring greater than equivalent amounts of polycarboxylic acid or polycarboxylic acid anhydride, such as those listed above, with relation to the polyhydric alcohol, such as those listed above, and polyhydroxy polyesters prepared by known procedures, employing mole ratios favoring greater than equivalent amounts of polyhydric alcohol with relation to the polycarboxylic acid or anhydride.

The relative amounts of the organic vic-epoxide, novel composition, and other organic hardener, if employed, preferably are such that they will provide from 0.1 to about 4.0 total active groups of the novel composition, e.g., equivalent carboxylic groups of the acid or anhydride and of any other organic hardener employed, e.g., amine groups of a polyfunctional amine, carboxylic groups or equivalent carboxylic groups of a polycarboxylic acid or anhydride, and/or a polycarboxy polyester and/or polyacyl halide, hydroxyl groups of a polyhydric alcohol and/or phenol, and/or polyhydric polyester, and the like, per vic-epoxy group contained by the organic vic-epoxide contained in the curable composition.

The following examples are presented:

*Example 1*

A solution consisting of 376 g. (2.72 moles) of diethyl phosphonate, 98 g. (1.0 mole) of maleic anhydride, and 4 g. of methylethyl ketone (MEK) peroxide (a 60 percent solution in dimethyl phthalate) was agitated and heated at 130°–133° C. for a period of 4 hours. An acidity determination by hydrolysis indicated that the resulting reaction mixture contained 3.70 equivalents of acid (theory=3.7 equivalents of acid if one mole of phosphonate has been added to one mole of maleic anhydride). To the reaction mixture was added 1.0 g. of cobalt Nuodex (6% Co solution) before stripping by pot distillation at 100° C./<0.5 mm. The resulting 245 g. of residue was further stripped of excess diethyl phosphonate by passing through a falling-film type still at 56° C./<0.2 mm. There was thus obtained 236 g. (theory=236 g.) of dark yellow, fluid liquid which had an equivalent weight (by hydrolysis)=117.1

(theory=118)

Distillation of the above residue product in a falling-film type still provided 155.5 g. of pale yellow, fluid liquid distillate, diethoxyphosphinylsuccinic anhydride, having the following properties: soluble in water, $$n_D^{20} = 1.4540$$

equivalent weight (by hydrolysis)=123.7 (theory=118), percent C=41.12 (theory=40.68), percent H=6.15 (theory=5.55), percent P=13.80 (theory=13.11), percent yield=66 (based on the maleic anhydride). The infrared spectrum was consistent with the following structure:

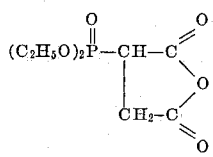

*Example 2*

A solution consisting of 155 g. (0.75 mole) of di(2-chloroethyl) phosphonate, 49 g. (0.5 mole) of maleic anhydride, and 3.5 g. of MEK peroxide (a 60 percent solution in dimethyl phthalate) was agitated and heated at 129°–130° C. for a period of 4 hours. To the reaction mixture was added about 2.0 g. of cobalt Nuodex (6% Co solution) before stripping the reaction mixture by distillation in a falling-film type still at 78° C./<0.2 mm. Distillation of the resulting residue product at 150° C./<0.1 mm. in a falling-film type still yielded 126 g. (theory=152.5 g.) of yellow, fluid liquid distillate, di(2-chloroethoxy)phosphinylsuccinic anhydride, having the following properties: $n_D^{20}$=1.4904, equivalent weight (by hydrolysis)=102.3 (theory=101.7 if the equivalent weight=one-third the molecular weight), percent Cl=24.01 (theory=23.05), percent P=11.05

(theory=10.16)

percent yield=82.4 (based on the anhydride). The infrared spectrum was consistent with the following structure:

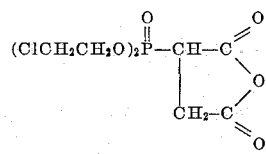

*Example 3*

A solution consisting of 117 g. (0.5 mole) of diphenyl phosphonate, 49 g. (0.5 mole) of maleic anhydride, and 2.8 g. of MEK peroxide (a 60 percent solution in dimethyl phthalate) was agitated and heated at 125°–131° C. for a period of 4 hours. After adding about 2.0 g. of cobalt Nuodex (6% Co solution), the reaction mixture was stripped using a falling-film type still at 78° C./<0.1 mm. The resulting 109 g. of residue was distilled using a falling-film type still at 150° C./<0.1 mm. to yield 73 g. of dark yellow, liquid distillate, diphenoxyphosphinylsuccinic anhydride, having the following properties: $n_D^{20}$=1.5532, equivalent weight (by hydrolysis)=167 (theory=166.1), percent C=59.49 (theory=59.84), percent H=4.58 (theory=3.94), percent yield=44. The infrared spectrum was consistent with the following structure:

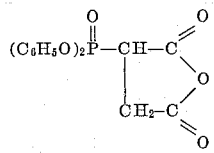

*Example 4*

A solution consisting of 135 g. (0.65 mole) of di-(2-chloroethyl) phosphonate, 73.5 g. (0.75 mole) of maleic anhydride, and 3.5 g. of MEK peroxide (a 60 percent solution in dimethyl phthalate) was agitated and heated at 128°–134° C. over a period of 12.0 hours. The reaction mixture was checked periodically for acidity by hydrolysis. The final brown, liquid reaction mixture, which initially had an equivalent weight (by hydrolysis)=84.8, had an equivalent weight (by hydrolysis)=98.6 (theory=96.8). The product, therefore, is essentially a mixture of 0.10 mole of maleic anhydride and 0.65 mole of di(2-chloroethoxy)phosphinylsuccinic anhydride.

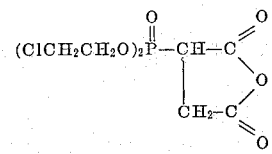

This mixture of anhydrides was employed without further purification as a curing agent for epoxy resins as illustrated by the following:

A solution consisting of 5.29 g. of 3,4-epoxy-6-methyl-cyclohexylmethyl 3,4-epoxy-6-methylcyclohexanecarboxylate and 4.71 g. of the above mixture of anhydrides (equivalents ratio=1.0 carboxyl per vic-epoxy group) was heated to 70° C. A clear, brown resin was prepared by further heating the solution for 2 hours at 120° C. The resin had a Barcol hardness of 42 and was self-extinguishing when heated with the flame from a Bunsen burner.

*Example 5*

A resin was prepared using 3,4-epoxy-6-methylcyclohexylmethyl 3,4-epoxy-6-methyl-cyclohexanecarboxylate and the product of Example 1 in the presence of a basic catalyst as follows:

A solution consisting of 29.7 g. of the epoxide and 40.3 g. of diethoxyphosphinylsuccinic anhydride was made at 25° C. (equivalents ratio=1.8 carboxyl per vic-epoxy group). Upon the addition of 0.35 g. of benzyldimethylamine the reaction temperature spontaneously increased from 25° to 35° C. The resulting solution was heated to 70° C. and used to make resin bars (6" x ½" x ½"). The resin (percent P=7.56) was gelled at 80° C. and post cured for 2 hours at 120° C. and 6 hours at 160° C. The resulting red-brown resin had a Barcol hardness of 20, was tough to a knife cut, and was flame-resistant.

*Example 6*

A resin was prepared using 3,4-epoxy-6-methylcyclohexylmethyl 3,4-epoxy-6-methylcyclohexanecarboxylate and the product of Example 2 in the absence of a catalyst as follows:

A solution consisting of 5.45 g. of the epoxide and 9.55 g. of di(2-chloroethoxy)phosphinylsuccinic anhydride (equivalents ratio=1.8 carboxyl per vic-epoxy group) was heated to 70° C. and then gelled at 120° C. After further curing at 160° C. for 6 hours, a yellow, tough, flexible resin (percent P=6.47 and percent Cl=14.82) was obtained. It was immediately self-extinguishing when heated with the flame from a Bunsen burner.

*Example 7*

A resin was prepared using 3,4-epoxy-6-methylcyclohexylmethyl 3,4-epoxy-6-methylcyclohexanecarboxylate and the product of Example 2 in the presence of an acidic catalyst as follows:

A solution consisting of 5.62 g. of the epoxide, 4.38 g. of di(2-chloroethoxy)phosphinylsuccinic anhydride (equivalents ratio=0.8 carboxyl per vic-epoxy group), and 0.05 g. of $BF_3$-piperidine was gelled at 120° C. during 2 hours. The resin (percent P=4.58 and percent Cl=10.10), after post curing at 160° C. for 6 hours, was a clear, light yellow, and had a Barcol hardness of 45. It was self-extinguishing when heated with the flame from a Bunsen burner.

*Example 8*

Example 7 was repeated using stannous octoate instead of $BF_3$-piperidine as catalyst. The resin (percent P=4.58 and percent Cl=10.10) was not gelled after 2 hours at 120° C., but was a hard (Barcol hardness of 45), clear, yellow resin after curing an additional 6 hours at 160° C. The resin was immediately self-extinguishing when heated with the flame from a Bunsen burner.

*Example 9*

A resin was prepared using 3,4-epoxy-6-methylcyclohexylmethyl 3,4-epoxy-6-methylcyclohexanecarboxylate (Unox 201) and the product of Example 3 in the presence of an acidic catalyst as follows:

A solution consisting of 6.18 g. of Unox 201, 3.82 g. of diphenoxyphosphinylsuccinic anhydride (equivalents ratio=0.8 carboxyl per vic-epoxy group), and 0.05 g. of $BF_3$-piperidine was gelled at 120° C. during 2 hours. The resin (percent P=3.56), after post curing at 160° C. for 6 hours, was clear, light yellow, tough to a knife cut, and had a Barcol hardness of 43.

*Example 10*

A solution consisting of 0.5 mole di(chlorophenyl)phosphonate, 0.5 mole of chloromaleic anhydride and 2.8 g. of MEK peroxide (a 60 percent solution of dimethylphthalate) is agitated and heated at 125° C. to 135° C. for a period of about 8 hours. The reaction mixture is checked periodically for acidity by hydrolysis. The reaction mixture then is stripped after adding about 2.0 g. of cobalt Nuodex (6 percent Co solution). The resulting residue is distilled to provide di(chlorophenoxy)phosphinyl(chloro)succinic anhydride.

*Example 11*

A solution comprising 0.75 mole of methylmaleic anhydride, 0.65 mole of dicyclohexyl phosphonate and 3.5 g. of MEK peroxide (60 percent solution in dimethyl phthalate) is agitated and heated at 125° C. to 134° C. for a period of about 8 hours. The reaction is checked periodically for acidity by hydrolysis. The reaction mixture is stripped after adding cobalt Nuodex and the resulting residue is distilled to provide di(cyclohexoxy)phosphinyl (methyl)succinic anhydride.

*Example 12*

A solution containing 0.5 mole of phenylmaleic anhydride, 0.5 mole of di(bromocyclopentyl) phosphonate and 2.8 g. of MEK peroxide (60 percent solution in dimethyl phthalate) is agitated and heated at 125° C. to 135° C. for a period of about 8 hours. After adding about 2 g. of cobalt Nuodex, the reaction mixture is stripped and the resulting residue is distilled to provide di(bromocyclophenoxy)phosphinyl(phenyl)succinic anhydride.

Resins are prepared employing the diepoxide set forth in Example 9 and the novel products produced by Examples 10, 11 and 12 and there result solid resins which are self-extinguishing when heated with the flame of a Bunsen burner.

Reasonable variations and modifications of the invention can be made or carried out in the light of the above disclosure without departing from the spirit and scope thereof.

What is claimed is:
1. Diethoxyphosphinylsuccinic anhydride.
2. Di(2-chloroethoxy)phosphinylsuccinic anhydride.
3. Diphenoxyphosphinylsuccinic anhydride.
4. A compound selected from the class consisting of (1) a phosphinyl-substituted succinic acid and a phosphinyl-substituted succinic anhydride and (2) a phosphinyl-substituted succinic acid and a phosphinyl-substituted succinic anhydride wherein said succinic acid portion is additionally substituted with a moiety selected from the group consisting of alkyl, phenyl, and naphthyl and halogen-substituted derivatives thereof wherein said moiety contains up to 14 carbon atoms; and wherein the phosphorus atom of said phosphinyl group is substituted with two substituents selected from the group consisting of alkoxy, cycloalkoxy, phenoxy, alkylphenoxy, naphthoxy, alkylnaphthoxy, and halogen derivatives thereof, each of said substituents on said phosphinyl group containing up to 18 carbon atoms.
5. A phosphinyl-substituted succinic acid wherein the phosphorus atom of said phosphinyl group is substituted with two alkoxy containing up to 18 carbon atoms.
6. A phosphinyl-substituted succinic anhydride wherein the phosphorus atom of said phosphinyl group is substituted with two alkoxy containing up to 18 carbon atoms.
7. A phosphinyl-substituted succinic acid wherein the phosphorus atom of said phosphinyl group is substituted with two haloalkoxy containing up to 18 carbon atoms.
8. A phosphinyl-substituted succinic anhydride wherein the phosphorus atom of said phosphinyl group is sub- stituted with two haloalkoxy containing up to 18 carbon atoms.

9. A phosphinyl-substituted alkylsuccinic acid wherein said alkyl substituent on said succinic acid contains up to 14 carbon atoms and wherein the phosphorus atom of said phosphinyl group is substituted with two alkoxy containing up to 18 carbon atoms.

10. A phosphinyl-substituted alkylsuccinic anhydride wherein said alkyl substituent on said succinic anhydride contains up to 14 carbon atoms and wherein the phosphorus atom of said phosphinyl group is substituted with two alkoxy containing up to 18 carbon atoms.

11. A phosphinyl-substituted alkylsuccinic acid wherein said alkyl substituent on said succinic acid contains up to 14 carbon atoms and wherein the phosphorus atom of said phosphinyl group is substituted with two haloalkoxy containing up to 18 carbon atoms.

12. A phosphinyl-substituted alkylsuccinic anhydride wherein said alkyl substituent on said succinic anhydride contains up to 14 carbon atoms and wherein the phosphorus atom of said phosphinyl group is substituted with two haloalkoxy containing up to 18 carbon atoms.

13. A phosphinyl-substituted succinic acid wherein the phosphorus atom of said phosphinyl group is substituted with two phenoxy.

14. A phosphinyl-substituted succinic anhydride wherein said phosphorus atom of said phosphinyl group is substituted with two phenoxy.

15. A phosphinyl-substituted alkylsuccinic acid wherein said alkyl substituent and said succinic acid contain up to 14 carbon atoms and wherein the phosphorus atom of said phosphinyl group is substituted with two halophenoxy.

16. A phosphinyl-substituted alkylsuccinic anhydride wherein said alkyl substituent and said succinic anhydride contains up to 14 carbon atoms and wherein the phosphorus atom of said phosphinyl group is substituted with two halophenoxy.

References Cited by the Examiner
UNITED STATES PATENTS

| | | | |
|---|---|---|---|
| 2,324,483 | 7/1943 | Castan | 260—47 |
| 2,628,238 | 2/1953 | Patrick | 260—346.8 |
| 2,768,153 | 10/1956 | Shokal | 260—47 |
| 2,999,099 | 9/1961 | Feuer et al. | 260—346.8 |

NICHOLAS S. RIZZO, *Primary Examiner.*

JOSEPH R. LIBERMAN, *Examiner.*